United States Patent
Halek

(10) Patent No.: US 6,530,533 B1
(45) Date of Patent: Mar. 11, 2003

(54) WINDOWS WASHING DEVICE FOR WINDSHIELD WINDOWS

(75) Inventor: Stepan Halek, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/510,450

(22) Filed: Feb. 22, 2000

(30) Foreign Application Priority Data

Feb. 23, 1999 (DE) .......................... 199 07 694

(51) Int. Cl.⁷ ............................................. B05B 1/10
(52) U.S. Cl. .................................................. 239/284.1
(58) Field of Search ...................... 239/284.1, 284.2; 15/313; 296/96.15, 96.16, 96.17

(56) References Cited

U.S. PATENT DOCUMENTS

| 4,520,961 A | * | 6/1985 | Hueber ..................... 239/284.1 |
| 5,820,026 A | * | 10/1998 | Raghu ..................... 239/284.1 |
| 5,965,950 A | * | 10/1999 | Park ........................ 239/284.1 |
| 5,988,529 A | * | 11/1999 | Suhring ................... 239/284.1 |

* cited by examiner

Primary Examiner—Christopher Kim
(74) Attorney, Agent, or Firm—Michael J. Striker

(57) ABSTRACT

A window washing device for a windshield window of a vehicle has at least one spraying nozzle with at least one nozzle opening through which a spraying jet is sprayed onto a windshield window, the nozzle opening being adjustable so that an angle, which a direction of the nozzle opening encloses with the windshield window, is reduced with an increasing travel wind.

2 Claims, 3 Drawing Sheets

WINDOWS WASHING DEVICE FOR WINDSHIELD WINDOWS

BACKGROUND OF THE INVENTION

The present invention relates to a window washing device for a windshield window.

The window washing devices for vehicles, as a rule are used in connection with window wipers. They are activated when the moisture, due to precipitation, is not sufficient to clean the vehicle window. They contain a water container, spraying nozzles and a pump. The pump supplies water which can contain cleaning and antifreeze agents with pressure from the water container to the spraying nozzles. The feeding pressure of the pump is determined by the spraying nozzles, and the spraying nozzles are oriented so that when the vehicle is stopped, the water is distributed over a large surface through the wiping region of the window wiper, without throwing drops of water toward passersbys.

In the case of strong wind or increased vehicle speed, the spraying cone is drifted and pressed against the window, so that only a small, lower and insufficient region of the window is wetted. If the spraying nozzle is oriented or the pressure is increased so that with increased speed a sufficient region is wetted with water, then with the same spraying pressure and lower speed or when the vehicle is stopped, there is a danger that water bounces back from the window or is sprayed beyond the window and reaches passersbys. In this case, the water consumption is increased since a lot of water is required and a great part of the sprayed water is not used. As a result, the water container must have great dimensions or must be frequently filled. In addition, more cleaning agents and antifreeze agents are used, which contaminate the environment.

SUMMARY OF THE INVENTION

Accordingly, it is an object of the present invention to provide a window washing device for a windshield window, which avoids the disadvantages of the prior article.

In keeping with these objects and with others which will become apparent hereinafter, one feature of the present invention resides, briefly stated, in a window washing device for a windshield window, in which the nozzle opening is adjustable so that the angle which is enclosed between the direction of the nozzle opening and the windshield window reduces with an increasing travel wind.

The spraying jet, without consideration of the travel wind, reaches the upper region of the windshield window or sprays over the roof of the vehicle. The travel wind, however, deviates the spraying jet against the windshield window so that, despite the smaller angle, the spraying jet hits the center of the windshield.

In accordance with one embodiment of the invention, the spraying nozzle is mounted on a flat, yieldable component which changes its inclination relative to the windshield window in the reaction to the travel wind. The component which is either elastic or is elastically connected with a motor hood, is pressed down greater at the end which faces the travel wind than at the end which faces the windshield window. The yieldability is determined with regard to the travel wind so that the nozzle opening assumes a suitable inclination toward the windshield in correspondence with the travel wind. The force which the travel wind applies to the component depends, in addition to the strength of the travel wind, also on the size of the surface of the component subjected to the action of the stream, as well as on its resistance.

In accordance with another embodiment of the invention, the component is connected with the motor hood turnably about an axis of the hinge and is supported by a spring element which counteracts the force of the travel wind. The yieldability of the component can be easily determined by a modification of the spring rigidity of the spring element to the specific features of the vehicle.

It is further advantageous that the spring rigidity and the pre-tensioning of the spring element are adjustable. Advantageously, the turning movement of the component is limited by a stop, against which the spring element of the component presses in the immovable position or with a low travel wind.

For increasing the air resistance of the component and thereby improving the action of the travel wind, the component has a curvature which provides a greater engaging surface for the travel wind. Further, it is advantageous to provide a yieldable component both at the driver side and also at the co-driver side with a spraying nozzle, so that the whole windshield is sprayed.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
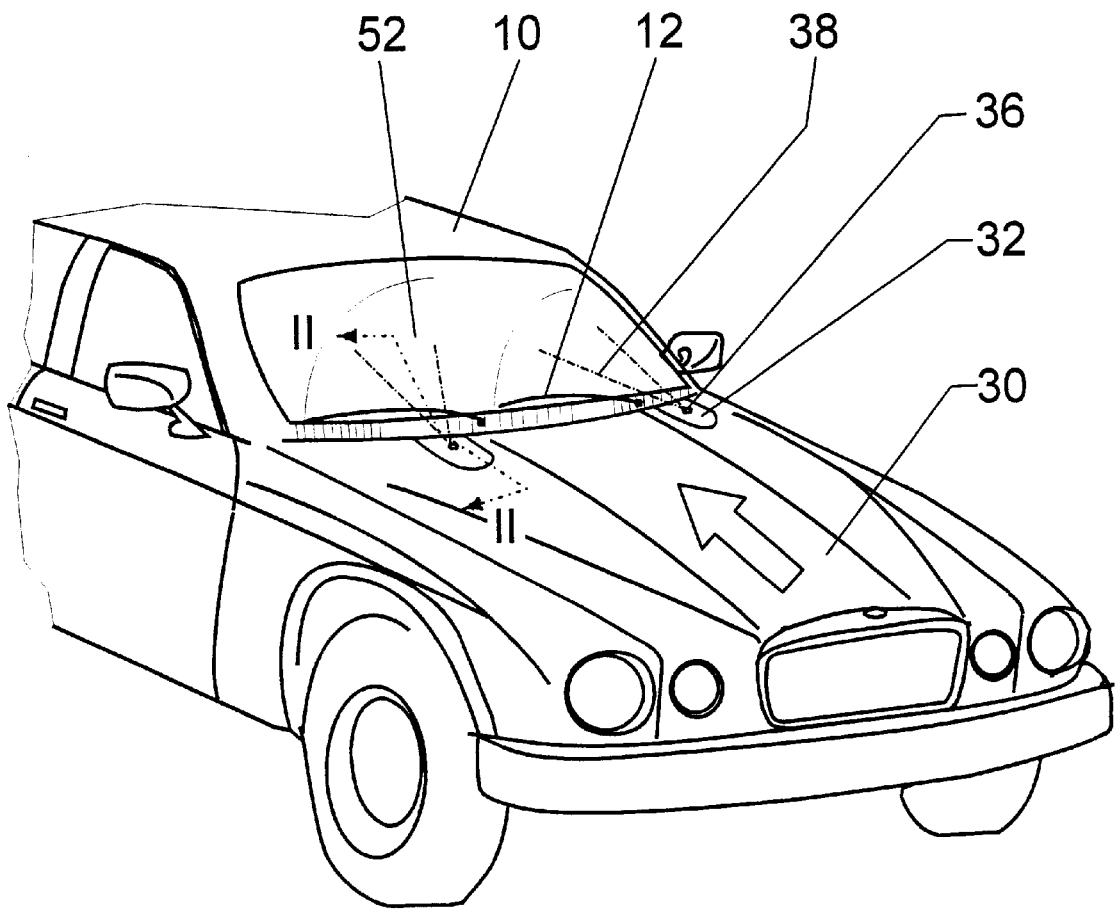
FIG. 1 is a perspective partial view of a vehicle with a window washing device in accordance with the present invention.

Reference number 10 identifies a vehicle in which a window wiper 12 is provided on a driver's side and on a co-driver's side. Its wiper blade 14 with a wiper lip 16 covers wiping field 52 on windshield window 18. Spraying nozzles 36 are arranged on a motor hood 30 at both vehicle sides. Their spraying jets 38 reach the wiping field 52 approximately in its center.

Figure 2:
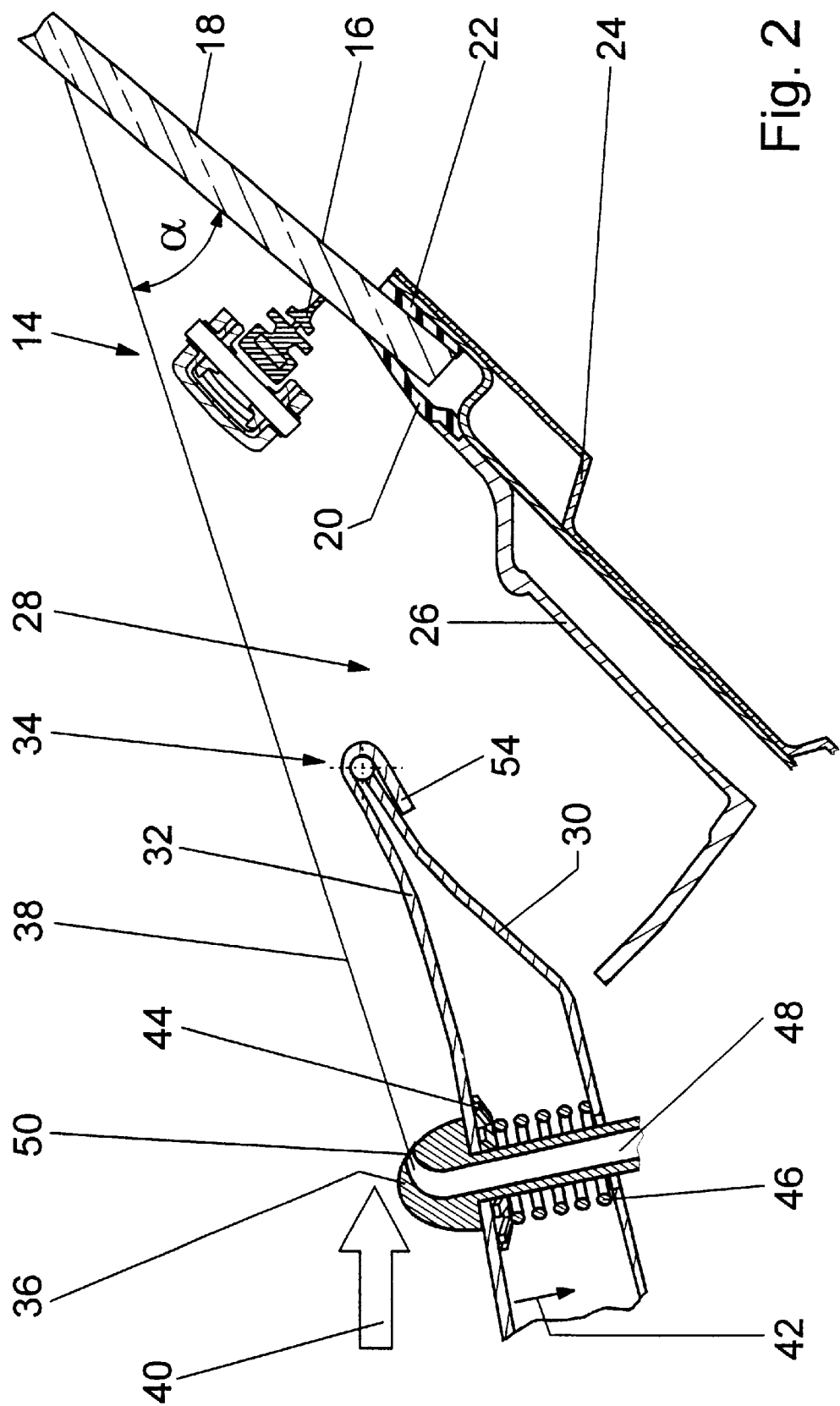
FIG. 2 is a view showing a schematic section corresponding to line 2—2 in FIG. 1.

The spraying nozzles 36 are activated when, during wiping, the natural moisture due to precipitation or spraying water is not sufficient for the window wiper 12 to achieve good wiping results. The spraying nozzles 36 are mounted on a component 32 which is formed as a flap, as shown in FIG. 2, so that the spraying jets 38 act in the case of a great travel wind 40 on the wiping field 52 in a favorable region and wet the same.

The flap 32 is connected by a hinge 34 with the motor hood 30 at one end which faces the windshield window 18. The spraying nozzle 36, which is mounted by a mounting element 44 on the flap 32, extends with the water passage 48 through the motor hood 30 and is connected with a not shown, conventional water source.

A spring element 46 formed as a helical spring surrounds the water passage 48 and presses the flap 32 against an abutment 54 or against an abutment which is formed by an adjusting screw. The adjusting screw, which is provided as an alternative to the abutment 54, can change the pre-tensioning of the spring element and adjust it to the specifics of the vehicle. It is thereby determined, to which intensity of the travel wind 40 the flap 32 reacts and changes the direction of the nozzle opening 50.

In the initial position, the nozzle opening 50 of the injection nozzle 36 is oriented to the wiping field 52 of the windshield window. The direction of the nozzle opening 50, which substantially corresponds to the spraying jet 38 without action fo the travel wind 40, forms an angle a with the windshield window 18. The travel wind 40 produces a force 42 on the flap 32, which increases with the increasing travel wind. The flap 32 is turned downwardly around the hinge 34 on the motor hood 30, when it overcomes the pre-tensioning of the spring element. Thereby the spraying jet 38 is displaced more toward the upper edge of the windshield window 18 so that the angle between the direction of the nozzle opening 50 and the windshield window 18 is smaller. Since the travel wind 40 acts simultaneously on the spraying jet 38, it deviates toward the windshield window 18. Whereby, it acts again approximately the same location of the wiping field 52, as without the action of the travel wind 40.

The spring element characteristic is determined in accordance with the vehicle specifics so that the spraying jet 38, at all speeds of the travel.

The spring element characteristic is determined in accordance with the vehicle specifics so that the spraying jet 38, at all speeds of the travel wind 40 acts in a favorable region of the wiping field 52 of the windshield window 18. Preferably, the spraying strength of the spring element 46 is adjustable, for changing and efficient spraying length, by an adjusting element 64.

The windshield window 18 is mounted on a vehicle chassis 24 by an elastic adhesive layer 22 and sealed from outside by a seal 20. A so-called hood gap 28 between the motor hood and the windshield window 18 is closed by a cover 26 from a not shown motor space.

Figure 3:
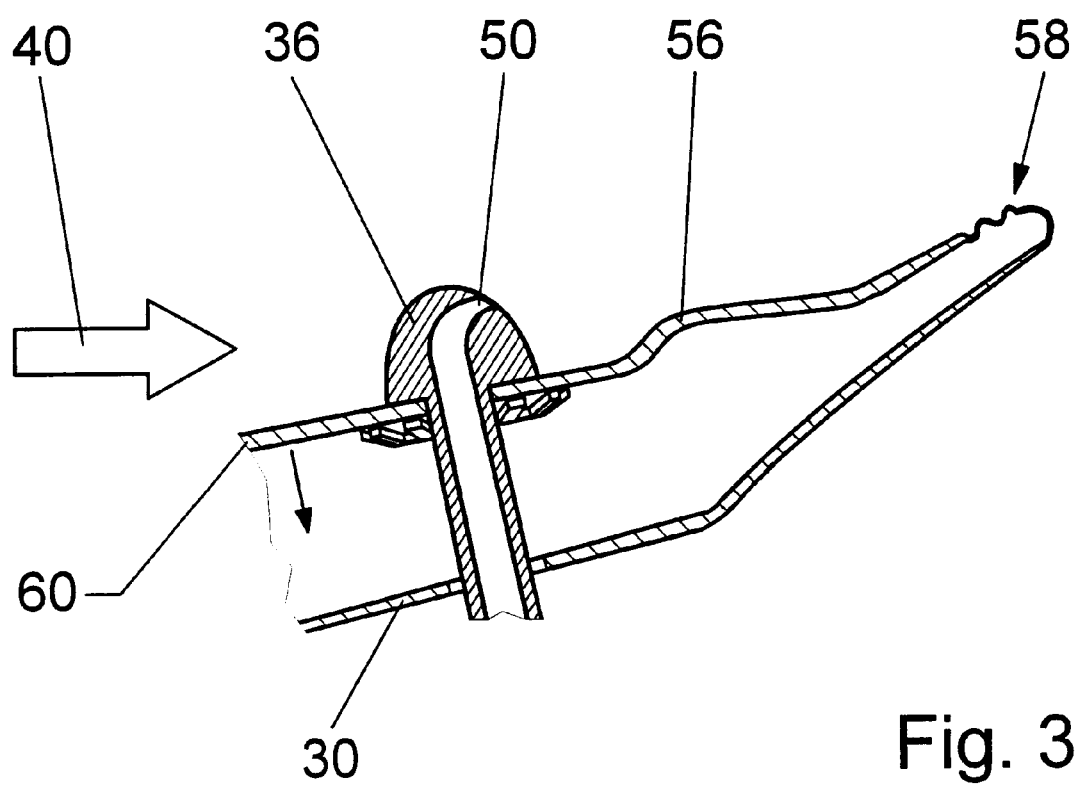
FIG. 3 is a view showing the very end of the embodiment to FIG. 2.

In a variant of the present invention which is shown in FIG. 3, a component 60 is mounted through an elastic connection 58 on the motor hood, in which the spraying nozzle 36 is located. The elastic connection 56 takes up the functions of the hinge 34 and the spring element 46. A curvature 56 which is steeper toward the direction of the travel wind 40, increases the air resistance and increases thereby the force 42 which the travel wind 40 applies to the component 60.

It will be understood that each of the elements described above, or two or more together, may also find a useful application in other types of constructions differing from the types described above.

While the invention has been illustrated and described as embodied in the window washing device for windshield window, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A window washing device for a windshield window of a vehicle, comprising at least one spraying nozzle with at least one nozzle opening through which a spraying jet is sprayable onto the windshield window, said nozzle opening being adjustable so that an angle which a direction of said nozzle opening encloses with the windshield window, is reduced when a travel wind increase; a substantially flat, yieldable component on which said spraying nozzle is mounted, said component on which said spraying nozzle is mounted continuously changing its inclination relative to the windshield window under an action of the travel wind producing on said component a force which increases when the travel wind increases, wherein said component is formed as a flap; a hinge arranged so that said flap is connectable with a motor hood turnably about an axis of said hinge; and a spring element on which said component is supported so as to counteract a force of the travel wind.

2. A window washing device for a windshield window of a vehicle, comprising at least one spraying nozzle with at least one nozzle opening through which a spraying jet is sprayable onto the windshield window, said nozzle opening being adjustable so that an angle which a direction of said nozzle opening encloses with the windshield window, is reduced when a travel wind increases; a substantially flat, yieldable component on which said spraying nozzle is mounted, said component continuously changing its inclination relative to the windshield window under an action of the travel wind, wherein said component is formed as a flap and has a curvature which increases an air resistsance and also has an elastic component connectable with a motor hood so as to counteract a force of the travel wind.

* * * * *